(12) United States Patent
Rosengren et al.

(10) Patent No.: US 10,883,578 B2
(45) Date of Patent: Jan. 5, 2021

(54) HIGH SPEED ROD-STYLE LINEAR ACTUATOR

(71) Applicant: Tolomatic, Inc., Hamel, MN (US)

(72) Inventors: Gary W. Rosengren, Brooklyn Park, MN (US); Wyatt A. Grunerud, Plymouth, MN (US)

(73) Assignee: Tolomatic, Inc., Hamel, MN (US)

( * ) Notice: Subject to any disclaimer, the term of this patent is extended or adjusted under 35 U.S.C. 154(b) by 276 days.

(21) Appl. No.: 15/552,855

(22) PCT Filed: Feb. 23, 2016

(86) PCT No.: PCT/US2016/019021
§ 371 (c)(1),
(2) Date: Aug. 23, 2017

(87) PCT Pub. No.: WO2016/137918
PCT Pub. Date: Sep. 1, 2016

(65) Prior Publication Data
US 2018/0045284 A1 Feb. 15, 2018

Related U.S. Application Data

(60) Provisional application No. 62/119,319, filed on Feb. 23, 2015.

(51) Int. Cl.
*F16H 19/06* (2006.01)
*F16H 25/20* (2006.01)
*F16H 57/01* (2012.01)

(52) U.S. Cl.
CPC ......... *F16H 19/06* (2013.01); *F16H 19/0622* (2013.01); *F16H 25/2015* (2013.01); *F16H 57/01* (2013.01); *F16H 2019/0686* (2013.01)

(58) Field of Classification Search
CPC .................. F16H 2019/0686; F16H 19/06
See application file for complete search history.

(56) References Cited

U.S. PATENT DOCUMENTS

| 4,118,993 A | 10/1978 | Noriomi et al. |
| 4,611,155 A | 9/1986 | Kurakake |

(Continued)

FOREIGN PATENT DOCUMENTS

| CN | 2767761 Y | 3/2006 |
| CN | 102418777 A | 4/2012 |

(Continued)

OTHER PUBLICATIONS

International Search Report and Written Opinion dated May 18, 2016 in connection with International Patent Application No. PCT/US2016/019021, 12 pages.

(Continued)

*Primary Examiner* — Terence Boes
(74) *Attorney, Agent, or Firm* — Dorsey & Whitney LLP

(57) ABSTRACT

An actuator (10) system includes an output rod (20) coupled to a piston member (30) disposed within an actuator housing (14) or cylinder (14). A belt drive (24) is configured to drive the piston (30) or similar coupling member (30) in reciprocal motion within the housing (14), along its longitudinal axis. The opposite end (22) of the output rod (20) is selectively positioned with respect to the exterior of the actuator housing (14) in response to the motion of the piston (30) within the housing (14); e.g., in order to manipulate a tool or workpiece at the opposite (exterior) end (22) of the output rod (20), or to perform another automated machine task.

17 Claims, 7 Drawing Sheets

(56) References Cited

U.S. PATENT DOCUMENTS

| | | | |
|---|---|---|---|
| 4,647,014 | A | 3/1987 | Ekman |
| 5,528,948 | A | 6/1996 | De Gelis |
| 5,719,479 | A | 2/1998 | Kato et al. |
| 7,389,974 | B2 | 6/2008 | Garrec |
| 8,408,083 | B2 | 4/2013 | Nielsen et al. |
| 8,516,913 | B2 | 8/2013 | Jones |
| 9,010,236 | B2 | 4/2015 | Ishibashi et al. |
| 2003/0039532 | A1 | 2/2003 | Aoyama et al. |
| 2010/0006401 | A1* | 1/2010 | Flury ............... F16H 19/06 198/805 |
| 2010/0206103 | A1 | 8/2010 | Duits et al. |
| 2010/0314359 | A1 | 12/2010 | Shinjo |
| 2012/0011949 | A1 | 1/2012 | Rosengren et al. |
| 2012/0260797 | A1 | 10/2012 | Ishibashi et al. |
| 2013/0150193 | A1* | 6/2013 | Fukano ............... F16H 7/18 474/148 |
| 2017/0233192 | A1* | 8/2017 | Peng ............... F16H 19/0622 198/750.1 |
| 2018/0292803 | A1 | 10/2018 | Kurek et al. |
| 2018/0355957 | A1* | 12/2018 | Senft ............... F16H 19/06 |
| 2019/0061154 | A1 | 2/2019 | Rosengren et al. |

FOREIGN PATENT DOCUMENTS

| | | |
|---|---|---|
| CN | 102734251 A | 10/2012 |
| DE | 102015104097 A1 | 9/2016 |
| EP | 0162343 A1 | 11/1985 |
| FR | 2746884 A1 | 10/1997 |
| WO | WO8300829 A1 | 3/1983 |
| WO | 2016137918 A1 | 9/2016 |

OTHER PUBLICATIONS

Extended European Search Report dated Jan. 23, 2019 in connection with European Patent Application No. 18190128.1, 11 pages.
Intention to Grant issued in European Patent Application No. 16710360.5. dated Dec. 5, 2019.
Budimir, Miles , "Motion Control Tips, 8 easy steps to selecting the right servo systems", Miles Budimir, Motion Control Tips, https://www.motioncontroltips.com/8-easy-steps-to-selecting-the-right-servo-systems/, Published Aug. 24, 2012 (Year 2012), Web page, Aug. 24, 2012.
Office Action received for Chinese Patent Application No. 201680011471X dated Jul. 22, 2019, 18 pages including 7 pages of English translation.
Communication pursuant to Article 94(3) EPC dated Feb. 25, 2020 in connection with European patent application No. 18190128.1, 5 pages.
Decision to grant dated Mar. 19, 2020 in connection with European patent application No. 16710360.5, 2 pages.
Examination Report dated Jun. 18, 2018 in connection with European Patent Application No. 16710360.5, 5 pages.
Second Office Action dated Apr. 13, 2020 in connection with Chinese Patent Application No. 201680011471X, 15 pages including English translation.
Third Office Action dated Sep. 9, 2020 in connection with Chinese patent application No. 201680011471X, 16 pages including English translation.
Zhang, Yaowu. "Hydraulic and pneumatic" China railway press, Feb. 28, 2014, pp. 66-67, 4 pages.

* cited by examiner

HIGH SPEED ROD-STYLE LINEAR ACTUATOR

CROSS-REFERENCE TO RELATED APPLICATIONS

This application is a U.S. National Stage Application of International Patent Application No. PCT/US2016/019021, filed Feb. 23, 2016 and claims priority to U.S. Provisional Application No. 62/119,319, entitled HIGH SPEED ROD-STYLE LINEAR ACTUATOR, filed Feb. 23, 2015, each of which is incorporated by reference herein, in the entirety and for all purposes.

BACKGROUND

This application relates generally to linear actuators, and in particular to high-speed linear actuator and thruster systems. More specifically, the application is directed to high-speed, rod-style linear actuators, suitable for use in parts handling, manufacturing, and other industrial processes.

Linear actuator and thruster systems include both rod-type actuators and rodless designs, utilizing a range of different pneumatic cylinders, electric motors and magnetically coupled drives to provide the desired load capacity and actuation speed. A variety of bearing styles are also known, which can be adopted to light, moderate and heavy loading applications, accordingly.

Rod-style actuator implementations include, but are not limited to, short-stroke devices for use in welding, machining, and other manufacturing processes. Pneumatic cylinder and screw-driven rod-type actuators can also be configured with guide rods and mounting blocks, for increased load weight and extension. Rodless (e.g., rail and carriage) systems can be provided in longer-stroke configurations, or where space savings is a concern.

Actuator weight and complexity are important design considerations, regardless of configuration. Cost concerns are also relevant, and there are also constant demands for improved actuator speed and precision automated control, which have not been met by existing actuator system designs.

SUMMARY

This application is directed to a high-speed, belt-driven, rod-style linear actuator system. The actuator system includes a belt drive disposed within a housing, and configured to position an output rod with respect thereto.

The belt drive includes a timing belt coupled to the output rod via a piston which is disposed within the actuator housing. The timing belt is configured to drive the piston reciprocally along a longitudinal axis of the housing, with the output rod disposed in an off axis relationship thereto.

DETAILED DESCRIPTION

Figure 1:
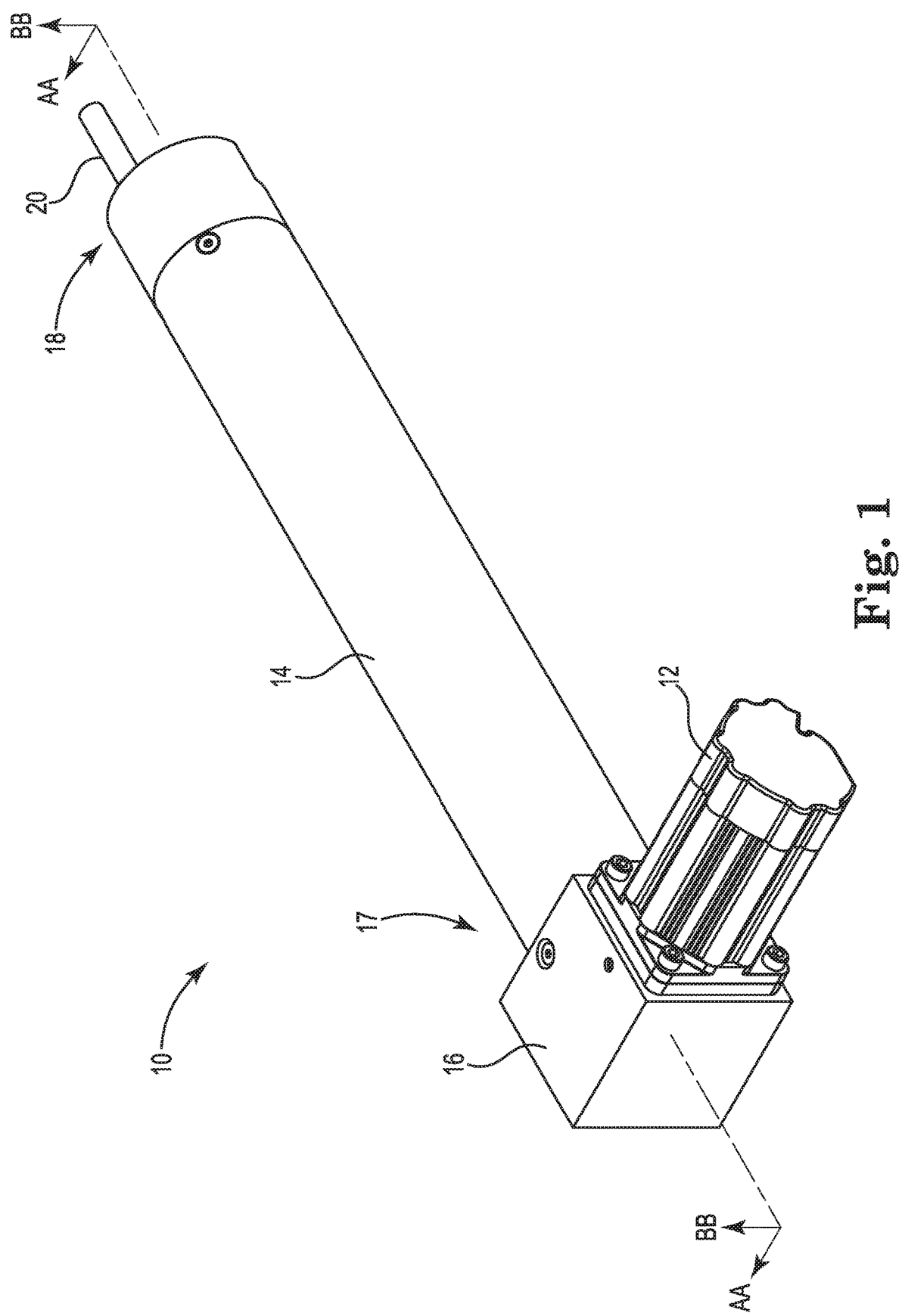
FIG. 1 is an isometric view of a high-speed, rod-style linear actuator system.

FIG. 1 is an isometric view of a high-speed, rod-style linear actuator or thruster system 10. In this particular configuration, actuator or thruster system 10 is driven by an electric motor or servomotor 12, which is coupled to actuator housing 14 via motor mount 16.

Actuator housing 14 extends from motor mount 16 at proximal end 17 to distal end 18, axially or longitudinally opposite proximal end 17. The external part of thrust rod (or output rod) 20 extends outward from distal end 18 of actuator housing 14, and can be provided with a tooling interface for positioning a tool or workpiece, as described below.

Figure 2:
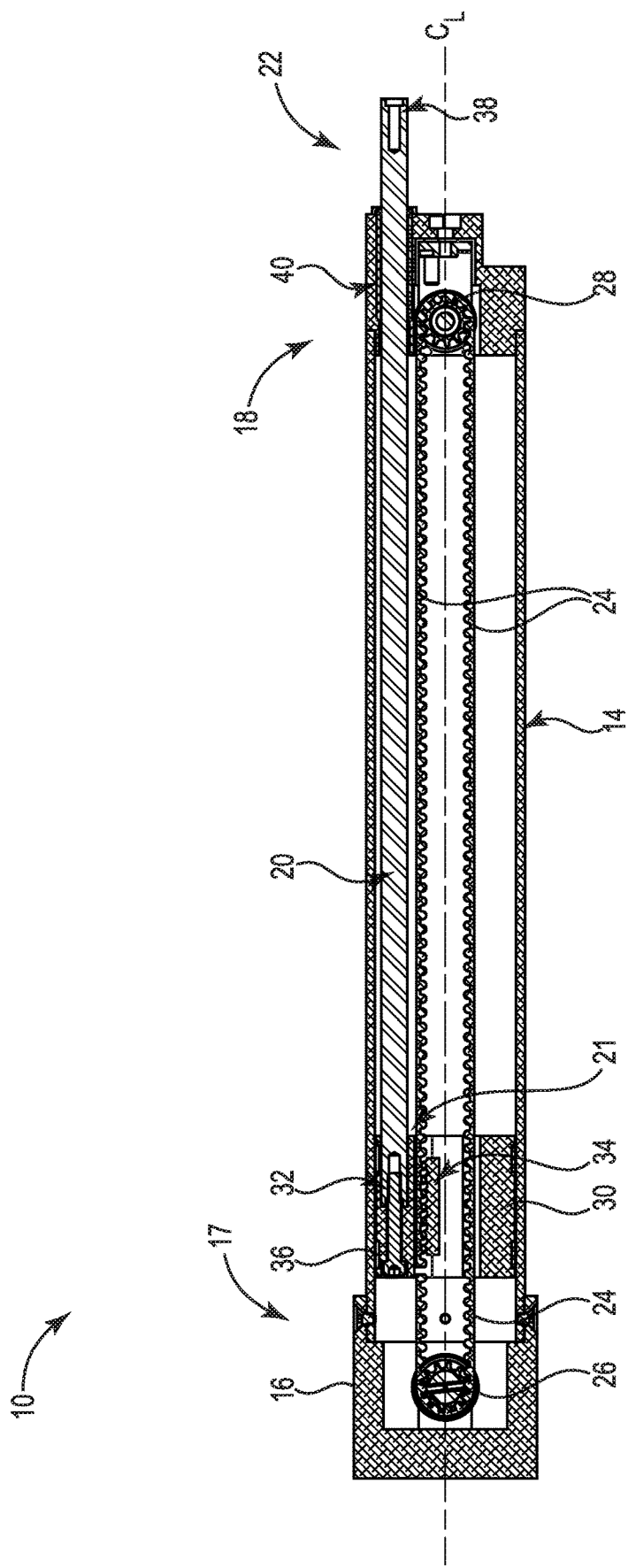
FIG. 2 is a sectional view of the actuator system, showing the drive belt and thrust rod or output rod configuration.

FIG. 2 is a sectional view of the linear actuator or thruster system (or apparatus) 10, taken along line AA-AA of FIG. 1. As shown in FIG. 2, thrust rod (or output rod) 20 extends from a first or proximal (internal) end 21 of rod 20, positioned within the actuator housing or main body tube 14, to a second or distal (external) end 22 of rod 20, extending longitudinally outward from distal end 18 of actuator housing 14. An (e.g., endless) drive belt 24 extends from drive pulley 26 in proximal end 17 of actuator housing 14 to idler pulley 28 in distal end 18.

A piston-type coupling member 30 is disposed within actuator housing 14 along longitudinal axis or centerline $C_L$. Drive belt 24 is configured to drive piston member 30 in reciprocal motion along axis $C_L$, with output rod 20 having a first end 21 coupled to piston member 30, opposite second end 22. The second (exterior) end 22 of output rod 20 is selectively positionable outside the distal (front) end 18 of actuator housing 14, in response to the reciprocal motion of piston member 20 along axis $C_L$. Drive belt 24 is coupled to drive pulley 26 at the back (proximal) end 17 of actuator housing 14, and to idler pulley 28 in the front end 18, opposite drive pulley 26.

More generally, any suitable belt drive system can be configured to reciprocally drive piston coupling 30 along longitudinal axis $C_L$ of actuator housing 14 according to any of the embodiments herein. e.g., with piston 30 coupled to a selectively positionable off-axis output rod 20, as described above. In one design, a continuous timing belt 24 is operated by a drive pulley 26 rotationally coupled to an electric servomotor. DC motor or stepper motor 12, which is configured to selectively position distal end 22 of output rod 20 with respect to front end 18 of actuator housing 14. For example, timing belt 24 can be coupled to and between a drive pulley 26 and idler pulley 28 disposed along longitudinal axis $C_L$ of housing 14, with output rod 20 positioned above timing belt 24, in a generally parallel off-axis configuration.

Output rod 20 is coupled to drive belt 24 via a piston-type coupling member 30, for example by seating first (proximal) end 21 into an axial cavity in the upper portion of coupling member (drive member or piston) 30, using a screw or other mechanical coupling for thrust rod attachment 32. A toothed timing belt or drive belt 24 can be utilized in the drive system, e.g., with a plurality of inwardly or outwardly-projecting teeth configured for engagement with complementary features on belt clamp 34. Belt clamp 34 is mechanically fastened to or within the body of coupling member 30, for example attaching the top or upper portion of drive belt 24 to the inner surface of coupling member 30, as shown in FIG. 2 (see also FIG. 5, as described below).

Wear rings or other sliding engagement members 36 are provided between the outer radius (or other outer surface) of coupling member 30 and the inner radius (or inner surface) of the actuator main body (e.g., tube or cylinder) housing 14. Suitable materials for wear rings 36 include durable polymers, metals, and composite materials, selected for providing a sliding engagement between piston or coupling member 30 and the inner surface of actuator housing 14. Alternatively, discrete wear members 36 can be provided on the outer circumference of the piston or other coupling member 30, or on the inner surface of actuator housing 14 (e.g., in rail form).

In operation, drive belt 24 is engaged to urge or move coupling member 30 and output rod 20 back and forth in an axial or longitudinal fashion within the actuator housing or tube 14, when drive belt 24 is engaged in corresponding back-and-forth motion between drive pulley 26 and idler pulley 28. A tapped hole or other tooling engagement feature 38 is provided in or on the distal end of output rod 20, in order to position a tool or workpiece longitudinally with respect to linear actuator housing 14.

In the configuration of FIG. 2, output rod 20 is positioned in an off-axis relationship with respect to actuator tube or housing 14, parallel to but radially outward from the actuator axis or centerline $C_L$. A bushing 40 is provided at front (distal) end 18 of actuator housing 14, supporting output rod 20 in sliding engagement above toothed or endless drive belt 24. Drive and idler pulleys 26 and 28 rotate in either a clockwise or counterclockwise sense when belt 24 drives output rod 20 forward and backward, respectively.

Alternatively, output rod 20 can be positioned above, below, and/or to either side of drive belt 24. In addition, either the top or bottom portion of drive belt 24 can be engaged with coupling member 30, and the back-and-forth motion of output rod 20 can be reversed with respect to the corresponding clockwise and counter-clockwise rotation of pulleys 26 and 28.

In some designs, actuator housing 14 is formed as a cylinder, or has a cylindrical or elliptical bore having a substantially circular or oval cross section, with a similarly-shaped piston (or piston coupling) 30 disposed about longitudinal axis $C_L$, perpendicular to the cross section. Alternatively, actuator system 10 may utilize a square, rectangular, polygonal, or other configuration for housing 14, with coupling member 30 being adapted accordingly. In each of these designs, one or more wear members 36 can be disposed in sliding engagement between piston 30 and the inner surface of actuator housing 14, e.g., with one or more wear rings 36 disposed about piston 30, as shown in FIG. 2. Alternatively, wear members can be oriented either along or transverse to axis $C_L$, in either continuous or discrete form, and configured for differently shaped piston members 30 and actuator housings 14.

A bushing 40 can be provided in front end 18 of actuator housing 14, disposed in sliding engagement with output rod 20 proximate distal end 22. For example, a ring-type bushing or bearing 40 can be disposed about output rod 20 in end cap 56, with rod axis A generally parallel to and offset from (e.g., above) longitudinal axis $C_L$ of actuator housing 14.

Figure 3:
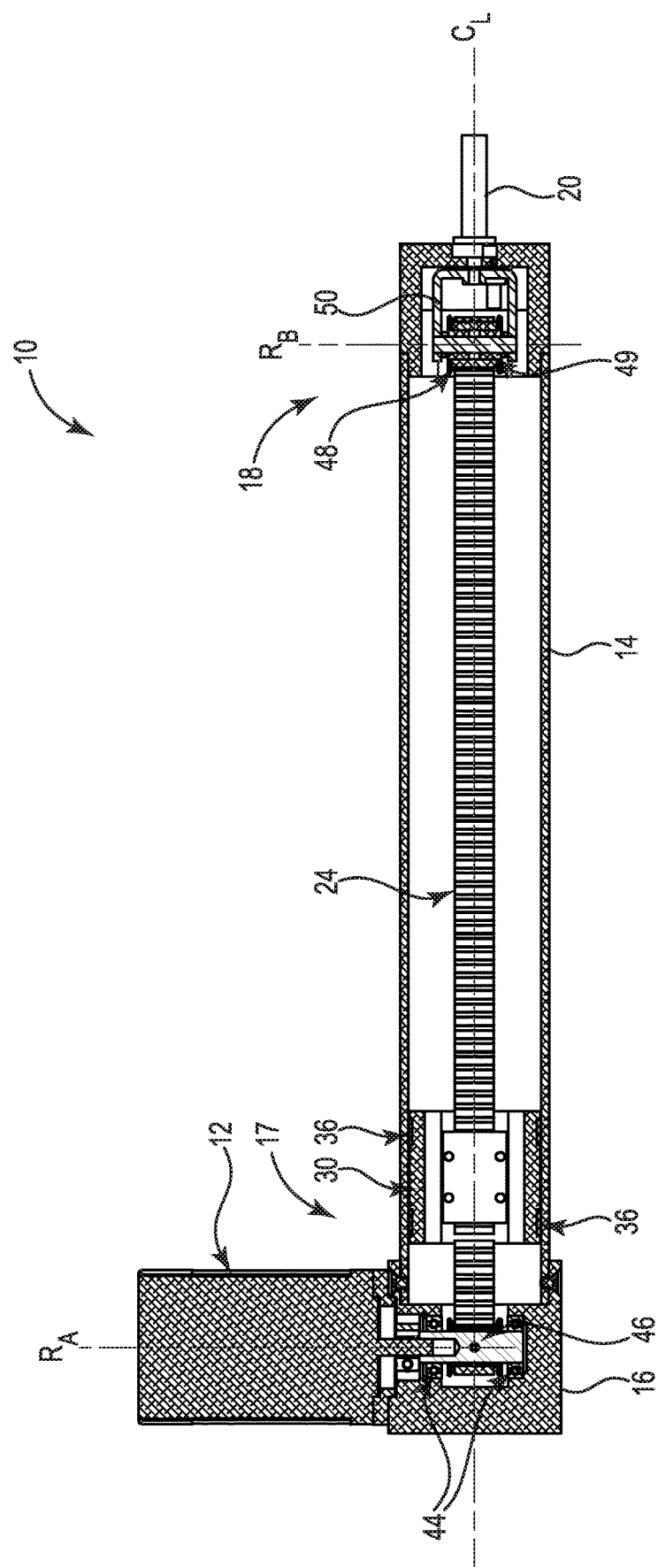
FIG. 3 is an alternate sectional view of the actuator system, showing the motor mount.

FIG. 3 is an alternate sectional view of thruster or actuator system 10, taken along line BB-BB of FIG. 1. As shown in FIG. 3, an electric motor (e.g., stepper motor or servomotor) 12 is utilized to drive timing belt 24, coupled in transverse orientation with respect to actuator housing via motor mount 16. In this configuration, rotational axis $R_A$ of motor 12 is generally perpendicular to the longitudinal dimension of actuator housing 14, as defined along the actuator centerline or axis $C_L$.

Drive pulley assembly 46 includes a drive pulley supported in rotation about axis $R_A$ on shaft bearings 44, within motor mount 16 at the back end of actuator housing 14 (proximal end 17). Idler pulley assembly 48 includes an idler pulley supported in rotation about axis $R_B$ on a needle bearing (or other bearing) 49, at the front end of actuator housing 14 (distal end 18). In this particular example, the drive and idler pulley rotational axes $R_A$ and $R_B$ are oriented generally parallel to one another, and generally perpendicular to the longitudinal dimension of actuator housing 14.

Motor 12 is rotationally coupled to drive pulley assembly 46, for example in a perpendicular mount configuration with the motor shaft rotational axis aligned along the drive pulley rotational axis ($R_A$), as shown in FIG. 3. Drive pulley assembly 46 drives continuous belt 24 into motion along longitudinal axis $C_L$ of the thruster or actuator 10, between drive pulley assembly 46 and idler pulley assembly 48. Yoke tensioner (or yoke assembly) 50 provides precise axial positioning of idler pulley assembly 48 with respect to drive pulley assembly 46, imparting the desired tension loading onto continuous drive belt 24.

In additional to servo type electric motors 12, stepping motors, DC motors, AC motors and other motor drive systems 12 can be utilized to rotate drive pulley assembly 46. Motor 12 can be also be mounted with the motor shaft and motor rotational axis in a transverse orientation as shown, or a generally parallel orientation with respect to longitudinal axis $C_L$ of actuator housing 14 (for example, using a gearbox or separate belt drive to couple motor 12 to drive pulley assembly 14).

Suitable materials for continuous drive belt 24 include metal reinforced polymers and rubberized plastics, with inwardly-projecting teeth configured to engage drive pulley assembly 46 and idler pulley assembly 48. Alternatively, continuous drive belt 24 can be provided in the form of a metal drive chain, or a substantially smooth or toothless drive belt.

FIG. 3 shows output rod 20 in a retracted position. In this position, continuous belt 24 is driven to position piston coupling 30 in a generally proximal direction with respect to distal end 18 of actuator housing 14; that is, toward drive pulley 26 in the back (proximal) end 17 of actuator 10, and away from idler pulley 28 in the front (distal) end 18. Output rod 20 is engaged with piston coupling 30, so that the tooling or workpiece on distal end 22 is retracted toward the front of actuator housing 14.

Motor 12 is rotationally coupled to drive pulley assembly 46, and configured to selectively position drive member 30 along longitudinal axis $C_L$ by driving belt 24 in response to the rotation of pulley assembly 46. Drive member 30 is coupled to the upper or lower portion of belt 24, and disposed in reciprocal engagement with the interior surface of actuator housing 14.

For example, a piston-type drive member 30 may be disposed about belt drive 24 along longitudinal axis CL of actuator housing 14, as shown in FIG. 3. In this design, output rod 20 can disposed generally parallel to and offset from belt drive 24, with respect to longitudinal axis $C_L$ as shown in FIG. 4.

Figure 4:
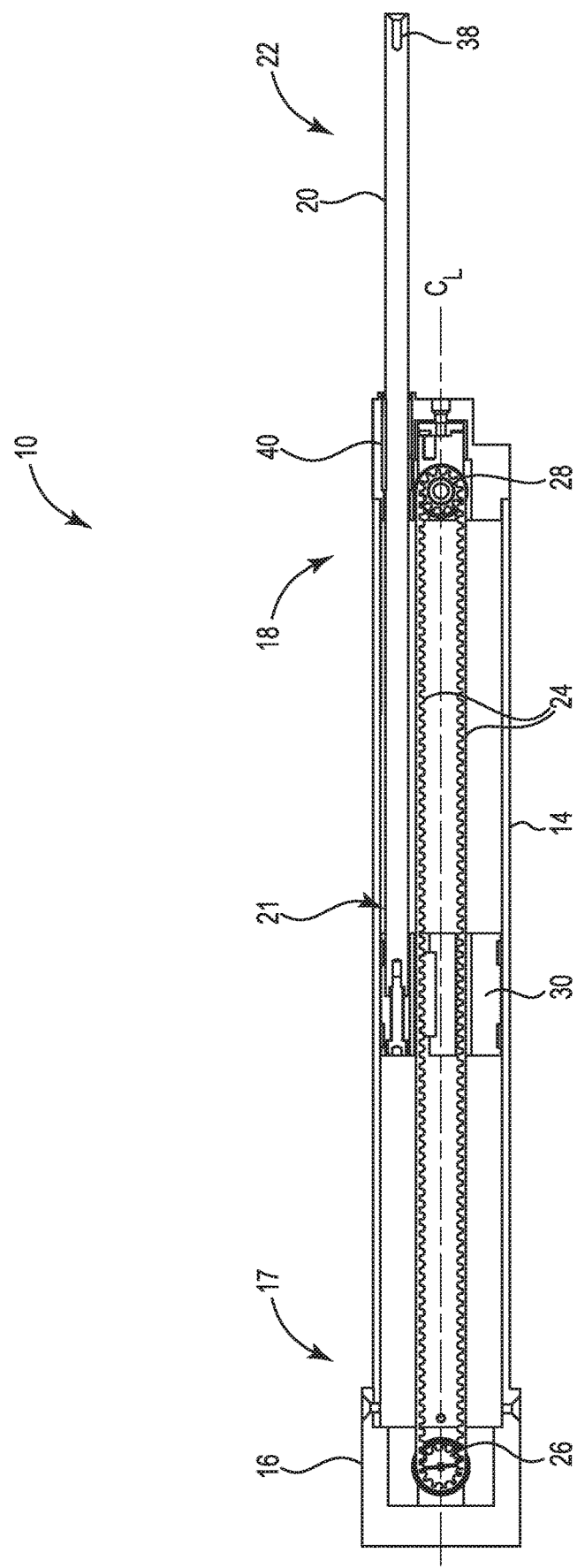
FIG. 4 is a side view of the actuator system, showing the output rod in an extended position.

FIG. 4 is a side cutaway view of actuator system 10, showing output rod 20 in an extended position. In this position, continuous belt 24 is driven to position coupling 30 in a generally distal direction with respect to proximal end 17 of actuator housing 14; that is, toward idler pulley 28 in the front (distal end) 18 of actuator 10, and away from drive pulley 26 in the back (proximal) end 17. Tooling engagement 38 is driven away from the front of actuator housing 14 to an extended position on distal end 22 of output rod 20, opposite coupling 30 on proximal end 21.

Generally, continuous belt 24 operates as a linear timing belt or timing chain, driven by electric motor 12 between drive pulley 26 and idler pulley 28. More specifically, drive belt 24 is configured to position piston coupling 30 along longitudinal axis $C_L$ of actuator housing 14, between drive pulley 26 in proximal end 17 of housing 14 and idler pulley 28 in distal end 18, respectively. Piston coupling 30 is attached to off-axis output rod 20, which moves back and forth along with piston coupling 30.

Electric actuator system 10 thus combines the functionality of screw-driven linear actuators and pneumatic rod type cylinders, utilizing a precision belt drive system. In particular, timing belt 24 can be driven at high speed to precisely position coupling 30 within actuator housing 14, extending tooling engagement 38 on distal end 22 of thrust rod (or output rod) 20 to one or more extended positions with respect to the front of housing 14, and then returning tooling engagement 38 to one or more retracted positions, in reciprocal fashion. Belt-driven actuator system 10 thus mimics the high-speed functionality of a pneumatic device, but also provides precision positional control characteristics of a screw-type linear actuator.

Actuator system 10 operates with a piston coupling or other drive member 30 disposed in reciprocal engagement within actuator housing 14, along longitudinal axis $C_L$. Output rod 20 is coupled to drive member 30 at first (interior) end 21, within housing 14, and extends to second (exterior) end 22, outside housing 14 and opposite first end 21. Belt drive 24 is coupled to drive member 30 within housing 14, and configured to selectively position drive member 30 and first end 21 of output rod 20 along (or adjacent to) longitudinal axis $C_L$. Thus, second end 22 of output rod 20 is selectively positioned outside housing 14 with respect to front end 18, in response to the reciprocal motion of drive member 30 along axis $C_L$ inside housing 14.

More specifically, actuator system 10 can be configured to position output rod 20 at speeds of at least 80 inches per second (that is, with a linear velocity of 200 cm/s or more). Lead screw and ball screw actuators are not easily configured for this form of motion, as the power screw typically reaches its critical (rotational) speed at a lower maximum linear velocity. That is, typical screw-driven actuators are not able to spin fast enough to achieve the desired linear velocity. Pneumatic actuators, on the other hand, require a compressed air source, and may not provide the same precision in positioning the output rod (e.g., at intermediate locations between the farthest extended and most retracted positions).

Depending upon application, the belt drive system may include a timing belt 24 coupled to drive member 30 between drive pulley 26 and idler 28, each disposed within actuator housing 14, e.g., along longitudinal axis CL as shown in FIG. 4. The timing belt drive configuration of actuator 10 does not require a compressed air source, and provides the same precision in linear position anywhere along range of motion of output rod 20. Belt-driven linear actuator 10 is also less sensitive to critical speed than traditional screw-type systems, allowing output rod 20 to be driven at substantially higher linear speed. By coupling output rod 20 to timing belt 24 at piston 30, output rod 20 can thus be extended and retracted to position a workpiece or tooling engagement 38 in similar fashion to a pneumatic cylinder rod, but in a lightweight, "airless" (electrically-driven), high-speed precision linear actuator system 10. Belt-driven electric actuator 10 also provides high linear velocity without the critical speed limitations of a rotating power screw configuration, and without requiring a source of compressed air, as in a traditional pneumatic cylinder device.

Figure 5:
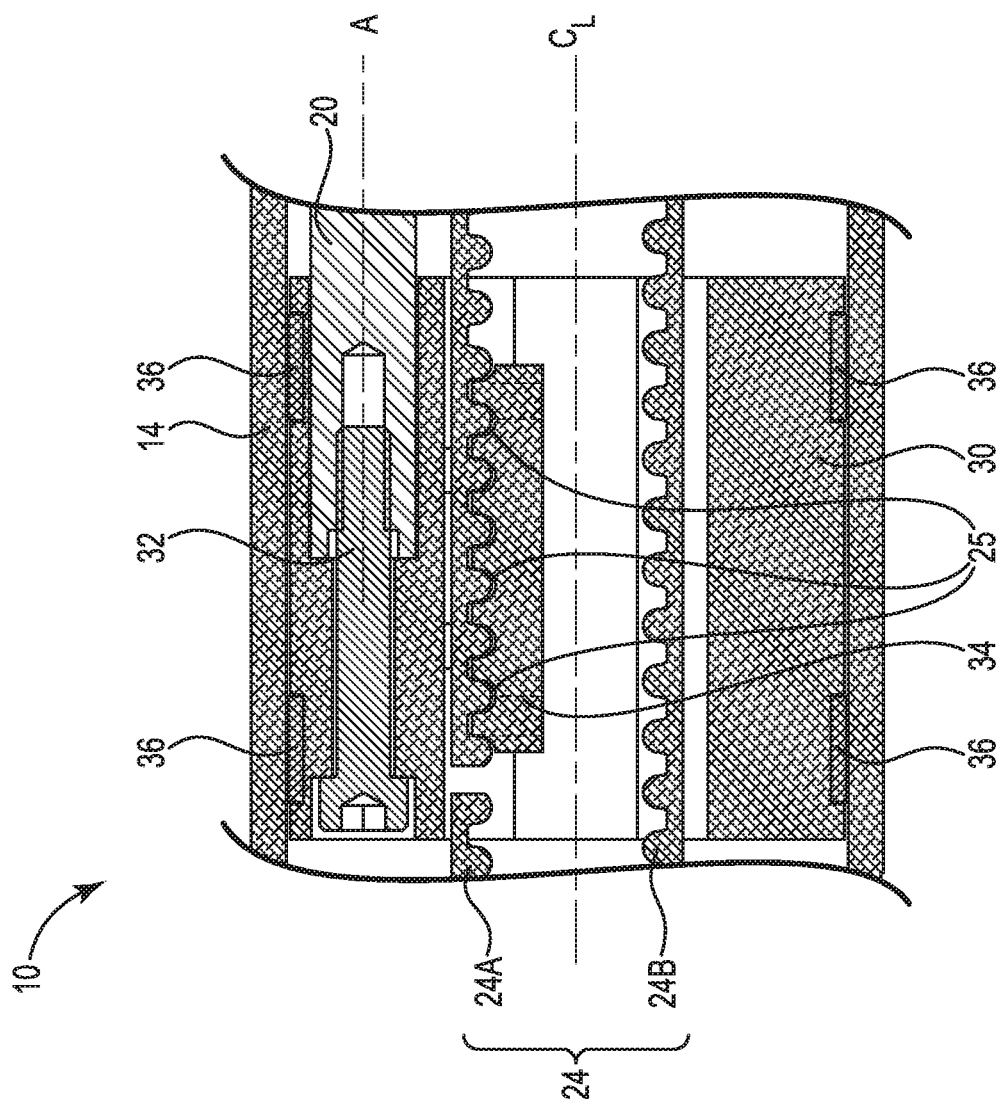
FIG. 5 is a detail view of the actuator system, showing the coupling between the output rod, piston and drive belt.

FIG. 5 is a detail view of actuator system 10, showing the piston-type coupling 30 between output rod 20 and drive belt 24. As shown in FIG. 5, actuator system 10 utilizes a cylindrical tube type housing 14, containing a mating piston coupling 30 configured to couple belt 24 to output rod 20. The proximal end of output rod 20 is positioned within an axial bore in piston coupling 30, and attached using a screw or other mechanical rod attachment 32.

In contrast to typical pneumatic piston actuators, output rod 20 is disposed in an offset configuration within actuator housing 14, with rod axis A positioned parallel to and radially offset from centerline $C_L$. In the particular configuration of FIG. 5, output rod 20 is disposed above timing belt 24, with rod axis A positioned between the inner surface of actuator housing 14 and top portion 24A of timing belt 24, opposite bottom portion 24B. Alternatively, output rod 20 can be located with rod axis A to either side of timing belt 24, below timing belt 24, or both to the side of and above or below timing belt 24.

In off-axis actuator configurations, output rod 20 is offset within actuator housing 14, generally parallel to and spaced from drive belt 24 along longitudinal axis $C_L$. Drive belt 24 may be provided in the form of a timing belt, with inwardly-projecting teeth 25 configured to engage a complementary sprocket structure on one or both of drive pulley 26 and idler pulley 28. A belt clamp 34 can be configured to attach piston 30 to timing belt 24, for example by engaging inwardly-projecting teeth 25 on top portion 24A, with output rod 20 disposed above belt 24 and in off-axis relationship with respect to centerline $C_L$ of actuator housing 14.

Piston coupling 30 is closely fitted to the inner surface of cylindrical tube or housing 14 using sliding wear rings 36, and is reciprocally driven through its travel length within actuator cylinder or housing 14 using timing belt (or transmission) 24. Thrust rod (or output rod) 20 is fastened off-axis with respect to centerline $C_L$ of housing 14 and piston coupling 30, with rod axis A located over drive belt 24 as described above.

This configuration provides space to attach timing belt 24 to piston coupling 30 via a belt clamp 34 or other mechanical attachment. For example, belt clamp 34 can be configured to engage one or more inwardly-protruding teeth or other features 25 on timing belt 24, which is centered about the main axis of motion of piston 30, along centerline $C_L$ of piston 30 and actuator housing 14.

In this particular design, actuator system 10 utilizes an "endless" timing belt 24. Other configurations may be constructed using a bulk belt material, for example with the ends joined together at belt clamp 34, or within piston coupling 30 (or at another location along top portion 24A or bottom portion 24B of timing belt 24). Similarly, belt 24 may be toothed or smooth, with belt clamp or coupling 34 configured accordingly. Belt 24 may also incorporate alternate timing features, e.g., optical or electromagnetic.

Figure 6:
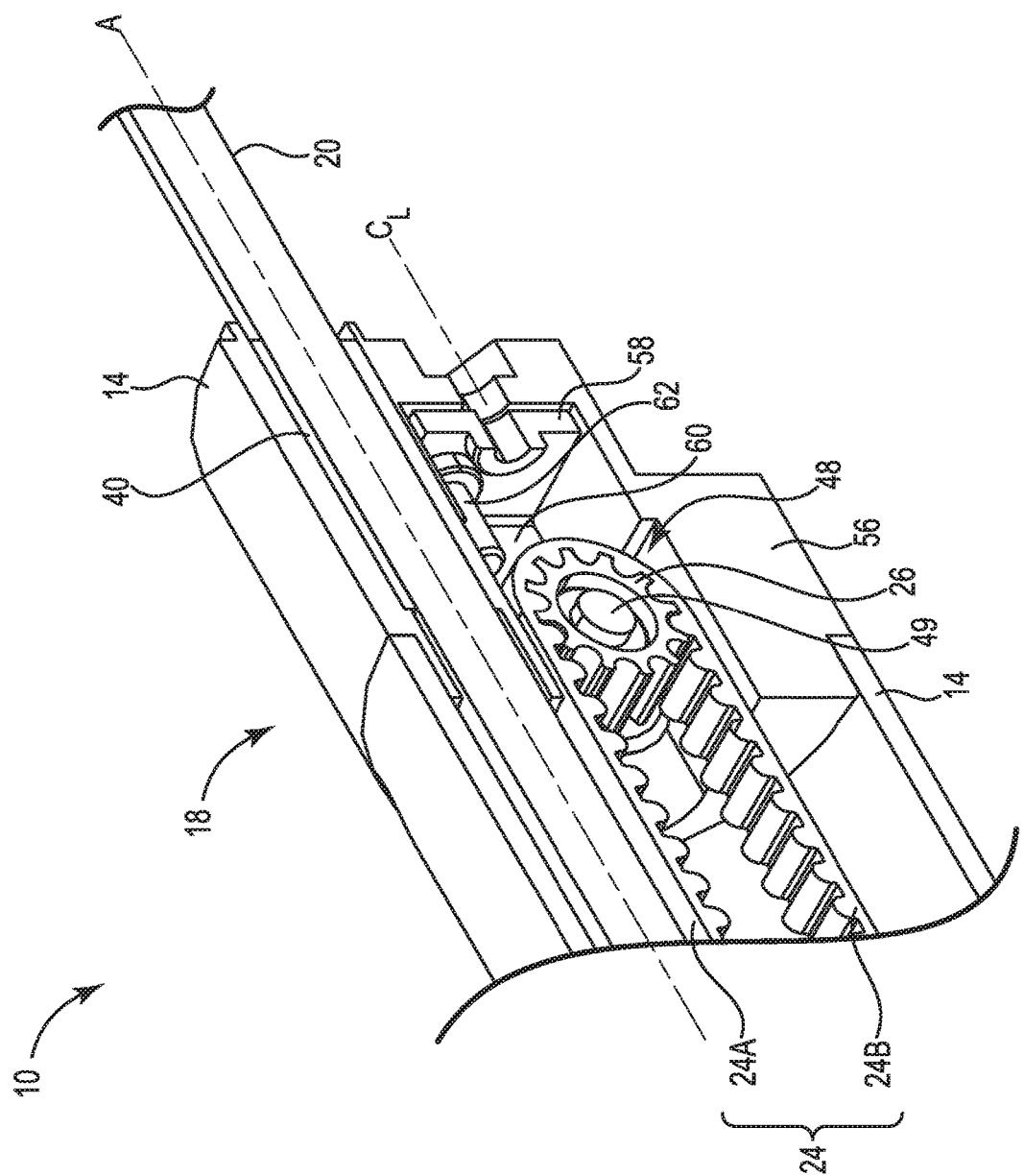
FIG. 6 is a detail view showing the distal end of the actuator system, including the idler pulley, tensioner mechanism and output rod bearing configuration.

FIG. 6 is a detail view showing the distal (or front) end 18 of actuator system 10, including idler pulley 28 and a bearing or bushing 40 disposed about output rod 20, in sliding engagement proximate second (exterior) end 22. As shown in FIG. 6, front end cap (or head) 56 of actuator housing 14 includes rod bushing 40, also off axis, and configured to support output rod 20 in sliding engagement along axis A extending though end cap 56. Rod bushing 40 and end cap 56 provide support and guidance for output rod 20 during reciprocal motion of actuator 10, complementary to the support provided by the piston coupling at the proximal end (see FIG. 5).

Front end cap or head 56 of actuator housing 14 also contains yoke tensioner assembly 50, disposed about idler pulley 28 along the piston axis or centerline $C_L$ of actuator housing 14. Yoke assembly 50 includes a front plate 58 and arms 60 on either side of drive belt 24, supporting idler pulley 28 in rotation about needle bearing 49. Yoke assembly 50 can also include a screw adjustment or other tensioning mechanism 62 to provide precision positioning of idler pulley 28 along centerline $C_L$ of actuator housing 14, and to provide the desired tension along timing belt 24.

Yoke (or yoke assembly) 50 has at least one arm 60 configured to rotationally support idler pulley (or idler) 28, and is selectively positionable along axis $C_L$ to tension drive belt 24 between drive pulley 26 and idler 28. For example, yoke 50 may include a front plate 58, which is selectively positionable along axis $C_L$ with respect to front end cap 56. In this particular configuration, two arms 60 extend from front plate 58 along longitudinal axis $C_L$, in order to rotationally support idler pulley 56 on either side.

In these various examples, actuator system 10 includes an output rod 20 coupled at one (inner) end 21 to a belt-driven piston coupling 30, which is disposed within an actuator housing or cylinder 14. A drive belt 24 is configured to urge or drive piston coupling 30 in reciprocal motion along longitudinal axis or centerline $C_L$ of actuator housing 14, so that the other (outer) end 22 of output rod 20 is selectively positionable with respect to front end 18 of actuator housing 14, outside end cap 56 in the axial direction.

Alternatively, actuator system 10 comprises a piston 30 disposed within actuator housing 14. Drive belt 24 is configured to urge or drive piston 30 in reciprocal motion along longitudinal axis $C_L$ of housing 14. Output rod 20 has one end 21 coupled to piston 30 and another opposite end 22 selectively positionable outside the front end of housing 14, according to the reciprocal motion of piston 30 along centerline $C_L$. Drive belt 24 can be coupled between a drive pulley 26 in back end 17 of housing 14 and an idler pulley 28 in front end 18, e.g., with idler pulley 28 positioned opposite drive pulley 26 along longitudinal axis $C_L$.

The yoke (or yoke assembly) 50 can be configured with at least one arm 60 to rotationally support idler pulley 26 in a selected position along longitudinal axis $C_L$ of actuator housing 14, in order to provide a desired tension to drive belt 24 between drive pulley 26 and idler pulley 28. For example, yoke 50 may include a front plate 58 selectively positionable with respect to end cap 56 on front end 18 of actuator housing 14 via a screw or other adjustment mechanism 62. Two opposing arms 60 can extend from front plate 58 within actuator housing 14, supporting idler pulley 28 in rotation at the selected position along longitudinal axis $C_L$.

Figure 7:
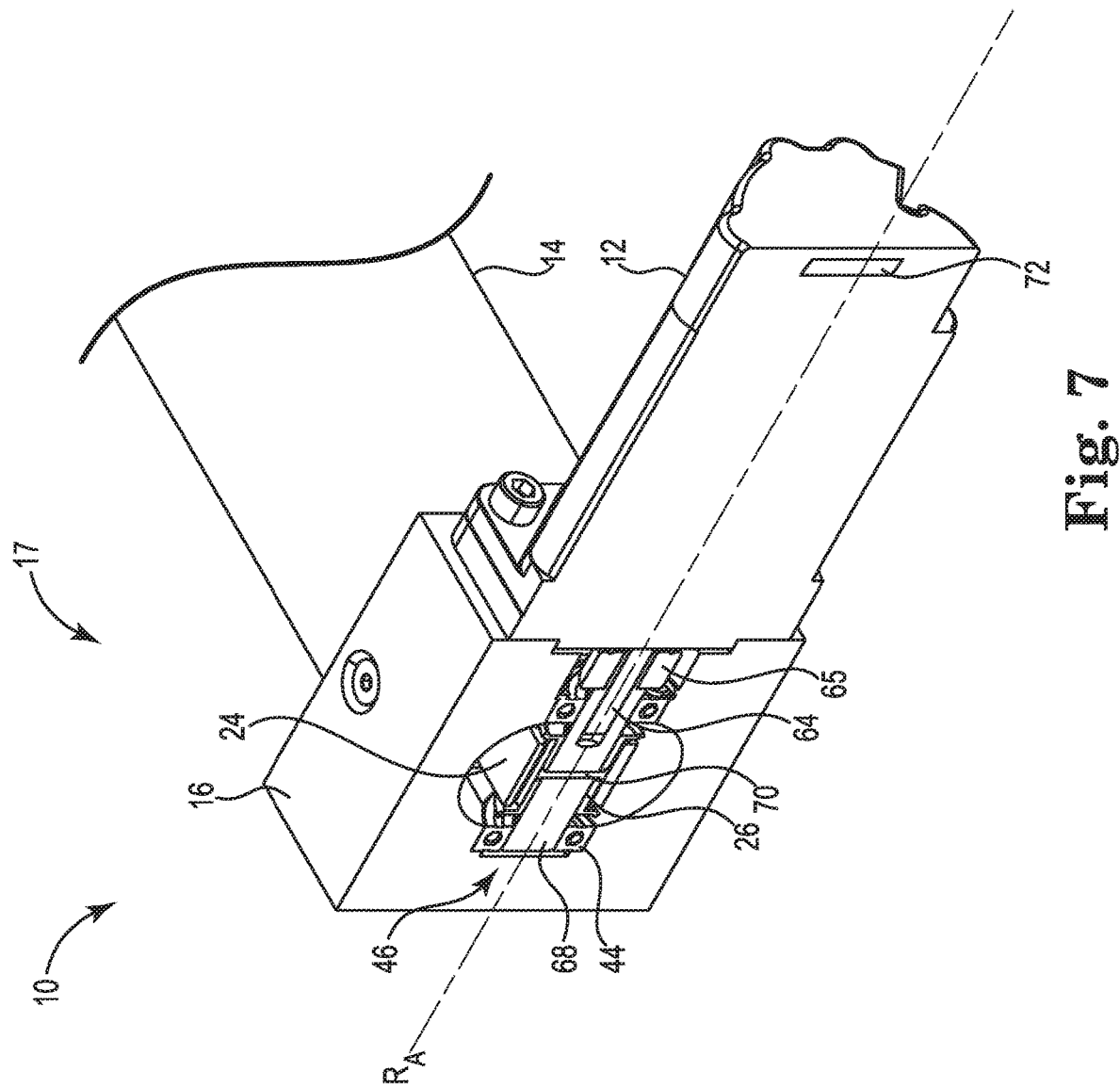
FIG. 7 is a detail view showing the proximal end of the actuator system, including the motor mount and drive pulley assembly.

FIG. 7 is a detail view showing the proximal (back) end 17 of actuator system 10, including motor 12, motor mount 16 and drive pulley 26. As shown in FIG. 7, the drive or motor end (proximal end 17) of linear actuator device 10 contains mounting structure 16 for motor 12, which is rotationally coupled to drive pulley 26 via motor shaft (or output shaft) 64, extending along co-rotational axis $R_A$ of drive pulley 26 and motor 12.

A stepper motor, DC motor, servomotor or other electric motor 12 can also be used, e.g., coupled to actuator housing 14 via motor mount 16 at back end 17 of housing 14. In transverse mount configurations, as described herein, motor shaft 64 can be directly coupled to drive pulley 26, so that motor 12, drive pulley 26 and idler pulley 28 all have generally parallel rotational axes, each of which is disposed generally transverse or perpendicular to longitudinal axis $C_L$ of actuator housing 14.

For example, motor 12 can be rotationally coupled to drive pulley 26 along a motor axis $R_A$, substantially transverse to longitudinal axis of housing 14. Bearings (e.g., ball bearings) 44 support drive pulley 26 in rotation about drive pulley axis $R_A$, for example using a split bore and clamp or locking collar 65 to couple drive pulley shaft 68 and motor shaft 64. Drive pulley 26 and pulley shaft 68 can be rotationally locked using a transverse or radial pin 70, or similar mechanism.

The position of drive pulley 26 and timing belt 24 is precision controlled to extend and retract the output rod in a longitudinal direction with respect to actuator housing 14, as described above. For example, a high speed servomotor 12 may include a rotary encoder or controller 72 within the motor housing, as shown in FIG. 7, or a similar encoder or controller may be disposed along or at the end of motor shaft 64 and pulley shaft 68. Alternatively, an electric stepper motor 12 or DC motor configuration can be employed with a separate encoder/controller configured to drive timing belt 24 by selective rotation of drive pulley 26.

For example, an electric motor 12 can be provided to drive actuator system 10 by rotationally coupling motor 12 to drive pulley 26. A motor controller or encoder system 72 can then be provided to selectively position the far end 22 of output rod 20 outside front end 18 of actuator housing 14, based on the rotational position of electric motor 12.

Methods of operating linear actuator system 10 are also encompassed by the present disclosure, according to any of the examples and embodiments herein. For example, an electric motor 12 can be rotationally coupled to drive belt 24 via drive pulley 26, and controlled using an encoder or other motor controller 72 to selectively position distal end 22 of output rod 20 based on the rotational position of motor 12, drive pulley 26, and/or idler pulley 28.

ADDITIONAL EXAMPLES

An exemplary actuator system includes an actuator housing having a longitudinal axis, a piston member disposed within the actuator housing along the longitudinal axis, and a drive belt coupled to the piston member. The drive belt is configured to drive the piston member in reciprocal motion along the longitudinal axis, with an output rod having a first end coupled to the piston member and second end selectively positionable outside the actuator housing, in response to the reciprocal motion of the piston member within the actuator housing.

In these systems the drive belt can be coupled to a drive pulley in the back end of the actuator housing, with an idler pulley in the front end, disposed opposite the drive pulley along the longitudinal axis. A yoke can be provided with at least one arm configured to rotationally support the idler pulley, where the yoke is selectively positionable along the longitudinal axis of the actuator housing to tension the drive belt between the drive pulley and the idler pulley. For example, the yoke may have a front plate selectively positionable with respect to the front end of the actuator housing, and two arms extending along the longitudinal axis to rotationally support the idler pulley between them.

Additional features may include an electric motor rotationally coupled to the drive pulley and a motor controller configured for selective rotation of the motor, where the second end of the output rod is positioned outside the actuator housing based on the selective rotation. Suitable motors include a stepper motor, a DC motor, or an electric servomotor, e.g. transversely mounted to the actuator housing in the back end, where the electric motor, the drive pulley and the idler pulley each has a rotational axis disposed generally transverse to the longitudinal axis of the actuator housing.

The output rod can be disposed off-axis within the actuator housing, generally parallel to and spaced from the drive belt along the longitudinal axis. The drive belt can include a plurality of projecting teeth, e.g., configured for engagement with the drive pulley, with a clamp attachment configured to attach the piston member about the drive belt by engagement with one or more of the teeth.

The piston member can also be disposed about the drive belt, along the longitudinal axis of the actuator housing, and configured in reciprocal engagement with the inner housing surface. Where the actuator housing is a cylinder or has a cylinder or elliptical bore with a substantially circular or oval cross section, the piston member can be disposed about the longitudinal axis, with one or more wear members or rings disposed in sliding engagement between the piston member and the inner surface of the actuator housing. A bushing can also be disposed in sliding engagement about the distal end of the output rod, in the front end of the actuator housing.

The linear actuator apparatus may also have a drive member in reciprocal engagement within a housing, disposed along the longitudinal axis. The output rod has a first end coupled to the drive member within the housing, and a second end positionable exterior to the housing, opposite the first end. A belt drive is configured to selectively position the drive member within the housing, along the longitudinal axis, with the belt drive disposed within the housing and coupled to the drive member so that the second end of the output rod is selectively positioned outside (or exterior to) the housing.

Suitable belt drives include a timing belt coupled to the drive member, e.g., between a drive pulley and an idler disposed within the housing along the longitudinal axis. A motor can be rotationally coupled to the drive pulley, and configured to selectively position the drive member along the longitudinal axis by rotation thereof. Where the motor is rotationally coupled to the drive pulley along a motor axis, the axis can be substantially transverse (perpendicular or orthogonal) to, or substantial along (parallel to) the longitudinal axis of the housing.

Suitable drive members include a piston coupled to an upper or lower portion of the belt drive, and disposed in reciprocal engagement with an interior surface of the housing, e.g., where the piston member is disposed about the belt drive along the longitudinal axis of the housing. The output rod can be generally parallel to and offset from the belt drive (e.g., with respect to the longitudinal axis), with a bushing disposed about output rod, in sliding engagement proximate the second end.

Methods of operating such an actuator system or apparatus include supporting the output rod in sliding engagement within the actuator housing, where the output rod has a first end attached to the drive member and a second end selectively positionable exterior to the actuator housing, opposite the first end. Additional method steps include positioning the drive member in reciprocal motion within the actuator housing, along the longitudinal axis, and selectively controlling the reciprocal motion with a belt drive system, e.g., with a timing belt disposed between a drive pulley and an idler, along the longitudinal axis within the housing.

Where the drive member is coupled to the timing belt between the drive pulley and the idler, the second end of the output rod can be selectively positioned based on the rotational position of the drive pulley. Where the drive member comprises a piston disposed about the timing belt and coupled to its upper or lower portion, the method can include positioning the piston in reciprocal sliding engagement with the inner surface of the actuator housing. The method can also include supporting the output rod in sliding engagement at or proximate the second end, parallel to and offset from the longitudinal axis of the actuator housing.

While this invention has been described with reference to exemplary embodiments, it will be understood by those skilled in the art that various changes can be made and equivalents may be substituted without departing from the spirit and scope thereof. Modifications may also be made to adapt the teachings of the invention to particular problems, technologies, materials, applications and materials, without departing from the essential scope thereof. Thus, the invention is not limited to the particular examples that are disclosed herein, but encompasses all embodiments falling within the scope of the appended claims.

The invention claimed is:

1. An actuator system comprising:
   an actuator housing having a longitudinal axis;
   a piston member disposed within the actuator housing along the longitudinal axis;
   a drive belt coupled to the piston member, the drive belt configured to drive the piston member in reciprocal motion along the longitudinal axis;
   an output rod having a first end coupled to the piston member and second end opposite the first end, wherein the output rod is coupled to the drive belt via the piston member by seating the first end into an axial cavity in the piston member using a mechanical coupling, and wherein the output rod is disposed above the drive belt with a longitudinal axis of the output rod between an inner surface of the actuator housing and a top portion of the drive belt, opposite a bottom portion of the drive belt across the longitudinal axis of the actuator housing;
   one or more wear members or rings disposed in sliding engagement between the piston member and an inner surface of the actuator housing; and
   a bushing disposed in sliding engagement about the distal end of the output rod in a front end of the actuator housing;
   wherein the second end of the output rod is selectively positionable outside the actuator housing in response to the reciprocal motion of the piston member within the actuator housing; and
   a clamp attachment configured for clamping the drive belt to the piston member, wherein the clamp attachment clamps the drive belt to an inner surface of the piston member within a body of the piston member, and wherein the clamp attachment is disposed between the longitudinal axis of the output rod and the longitudinal axis of the actuator housing.

2. The actuator system of claim 1, wherein the drive belt is coupled to a drive pulley in a back end of the actuator housing and an idler pulley in the front end of the actuator housing, the idler pulley disposed opposite the drive pulley along the longitudinal axis, and further comprising a yoke having at least one arm configured to rotationally support the idler pulley, wherein the yoke is selectively positionable along the longitudinal axis of the actuator housing to tension the drive belt between the drive pulley and the idler pulley.

3. The actuator system of claim 2, wherein the yoke comprises a front plate selectively positionable with respect to the front end of the actuator housing and two arms extending along the longitudinal axis to rotationally support the idler pulley therebetween.

4. The actuator system of claim 2, further comprising:
an electric motor rotationally coupled to the drive pulley; and
a motor controller configured for selective rotation of the electric motor;
wherein the second end of the output rod is positioned outside the actuator housing in response to the selective rotation.

5. The actuator system of claim 4, wherein:
the electric motor comprises a stepper motor, a DC motor or an electric servomotor transversely mounted to the actuator housing in the back end thereof; and
wherein the electric motor, the drive pulley and the idler pulley each has a rotational axis disposed generally transverse to the longitudinal axis of the actuator housing.

6. The actuator system of claim 1, wherein the output rod is disposed off-axis within the actuator housing, generally parallel to and spaced from the drive belt along the longitudinal axis of the actuator housing.

7. The actuator system of claim 1, wherein the drive belt comprises a plurality of projecting teeth configured for engagement with the drive pulley and the clamp attachment attaches the piston member about the drive belt by engagement with one or more of the teeth.

8. The actuator system of claim 1, wherein the piston member is disposed about the drive belt along the longitudinal axis of the actuator housing, and further configured in reciprocal engagement with an inner surface thereof.

9. The actuator system of claim 6, wherein the actuator housing comprises a cylinder or cylinder bore having a substantially circular cross section and the piston member is disposed about the longitudinal axis thereof.

10. A linear actuator comprising:
a housing having a longitudinal axis;
a drive member in reciprocal engagement within the housing and disposed along the longitudinal axis thereof;
an output rod having a first end coupled to the drive member within the housing and a second end positionable exterior to the housing, opposite the first end;
a belt drive comprising a timing belt configured to selectively position the drive member within the housing along the longitudinal axis, wherein the timing belt is disposed within the housing and coupled to the drive member such that the second end of the output rod is selectively positioned exterior to the housing;
one or more wear members or rings disposed in sliding engagement between the drive member and an inner surface of the housing;
a bushing disposed in sliding engagement about the distal end of the output rod in a front end of the housing; and
a clamp attachment configured for clamping the timing belt to the drive member, wherein the clamp attachment clamps the timing belt to an inner surface of the drive member within a body of the drive member, and wherein the clamp attachment is disposed between a longitudinal axis of the output rod and the longitudinal axis of the actuator housing;
wherein the output rod is coupled to the timing belt via the piston member and disposed above the timing belt with the longitudinal axis of the output rod between an inner surface of the actuator housing and the upper portion of the belt drive, opposite a lower portion of the belt drive across the longitudinal axis of the actuator housing.

11. The linear actuator of claim 10, wherein the belt drive comprises the timing belt coupled to the drive member between a drive pulley and an idler disposed within the housing along the longitudinal axis, and further comprising a motor rotationally coupled to the drive pulley and configured to selectively position the drive member along the longitudinal axis by rotation thereof, wherein the motor is rotationally coupled to the drive pulley along a motor axis substantially transverse or parallel to the longitudinal axis of the housing.

12. The linear actuator of claim 10, wherein the drive member comprises a piston member coupled to an upper or lower portion of the timing belt and disposed in reciprocal engagement with an interior surface of the housing, and wherein the piston member is disposed about the timing belt along the longitudinal axis of the housing.

13. The linear actuator of claim 10, wherein the output rod is generally parallel to and offset above, below, or to either side from the timing belt with respect to the longitudinal axis of the housing, and further comprising a bushing disposed about the output rod in sliding engagement proximate the second end.

14. A method of operating a linear actuator, the method comprising:
supporting an output rod in sliding engagement within an actuator housing, wherein the output rod comprises a first end attached to a drive member and a second end selectively positionable exterior to the actuator housing, opposite the first end;
positioning the drive member in reciprocal motion within the actuator housing, along a longitudinal axis thereof; and
selectively controlling the reciprocal motion of the drive member with a belt drive system comprising a timing belt disposed between a drive pulley and an idler along the longitudinal axis within the housing;
wherein the drive member is coupled to the timing belt between the drive pulley and the idler, such that the second end of the output rod is selectively positioned based on a rotational position of the drive pulley;
wherein the drive member comprises a piston member disposed about the timing belt and coupled to an upper or lower portion thereof with a belt clamp clamped to an inner surface of the piston member within a body of the piston member, the belt clamp disposed between a longitudinal axis of the output rod and the longitudinal axis of the actuator housing, and wherein the linear actuator comprises one or more wear rings or other sliding engagement members positioned between an outer surface of the piston member and an inner surface of the actuator housing, and wherein the output rod is coupled to the timing belt via the piston member and disposed above the timing belt with the longitudinal axis of the output rod between an inner surface of the actuator housing and the upper portion of the belt drive, opposite a lower portion of the belt drive across the longitudinal axis of the actuator housing, and further comprising:

positioning the piston in reciprocal sliding engagement with an inner surface of the actuator housing; and supporting the output rod in sliding engagement proximate the second end, parallel to and offset from the longitudinal axis of the actuator housing.

15. The method of claim 14, further comprising selectively positioning the second end of the output rod outside the actuator housing based on a rotational position of an electric motor rotationally coupled to the drive pulley along a motor axis substantially transverse or parallel to the longitudinal axis of the housing.

16. The method of claim 14, wherein the timing belt comprises a plurality of inwardly or outwardly-projecting teeth configured for engagement with complementary features on the belt clamp mechanically fastened to the inner surface of the piston member.

17. The method of claim 14, wherein a material of the wear ring or sliding engagement member includes a durable polymer, metal, or composite material.

* * * * *